United States Patent
Alexander et al.

(10) Patent No.: US 9,697,132 B2
(45) Date of Patent: *Jul. 4, 2017

(54) STORE FORWARDING CACHE

(71) Applicant: International Business Machines Corporation, Armonk, NY (US)

(72) Inventors: Khary J. Alexander, Poughkeepsie, NY (US); Jonathan T. Hsieh, Poughkeepsie, NY (US); Christian Jacobi, Poughkeepsie, NY (US); James R. Mitchell, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,267

(22) Filed: Dec. 7, 2016

(65) Prior Publication Data

US 2017/0083445 A1    Mar. 23, 2017

Related U.S. Application Data

(63) Continuation of application No. 15/241,206, filed on Aug. 19, 2016, which is a continuation of application No. 14/614,748, filed on Feb. 5, 2015, now Pat. No. 9,483,409.

(51) Int. Cl.
*G06F 12/08* (2016.01)
*G06F 12/0877* (2016.01)

(52) U.S. Cl.
CPC .. *G06F 12/0877* (2013.01); *G06F 2212/1021* (2013.01); *G06F 2212/608* (2013.01)

(58) Field of Classification Search
CPC .................................................. G06F 12/0877
USPC ........ 711/125, 133, 154, 156, 159, 205, 221
See application file for complete search history.

(56) References Cited

U.S. PATENT DOCUMENTS

| | | |
|---|---|---|
| 4,991,090 A | 2/1991 | Emma et al. |
| 5,488,706 A | 1/1996 | Wendorf et al. |
| 5,526,510 A | 6/1996 | Akkary et al. |
| 5,649,155 A | 7/1997 | Krumm et al. |
| 5,724,536 A | 3/1998 | Abramson et al. |

(Continued)

OTHER PUBLICATIONS

Busaba et al., "IBM zEnterprise 196 microprocessor and cache subsystem", IBM J. Res. & Dev., vol. 56, No. 1/2, Paper 1, Jan./Mar. 2012, DOI: 10.1147/JRD.2011.2173962, © 2012 IBM, pp. 1-12.

(Continued)

*Primary Examiner* — Stephen Elmore
(74) *Attorney, Agent, or Firm* — Edward J. Wixted, III

(57) ABSTRACT

A load request is received to retrieve a piece of data from a location in memory and the load request follows one or more store requests in a set of instructions to store a piece of data in the location in memory. One or more possible locations in a cache for a piece of data corresponding to the location in memory is determined. Each possible location of the one or more possible locations in the cache is determined. It is then determined if at least one location of the one or more possible locations contains data to be stored in the location in memory. Data in one location of the at least one location is loaded, the data in the one location is from a store request of the one or more store requests and the store request is closest in the set of instructions to the load request.

1 Claim, 3 Drawing Sheets

(56) References Cited

U.S. PATENT DOCUMENTS

| | | | |
|---|---|---|---|
| 5,860,104 A | 1/1999 | Witt et al. | |
| 5,881,262 A | 3/1999 | Abramson et al. | |
| 5,898,854 A | 4/1999 | Abramson et al. | |
| 5,930,819 A | 7/1999 | Hetherington et al. | |
| 5,987,561 A | 11/1999 | Witt et al. | |
| 6,006,309 A | 12/1999 | Shelly et al. | |
| 6,079,006 A | 6/2000 | Pickett | |
| 6,141,747 A | 10/2000 | Witt | |
| 6,189,068 B1 | 2/2001 | Witt et al. | |
| 6,349,382 B1 | 2/2002 | Feiste et al. | |
| 6,463,523 B1 | 10/2002 | Kessler et al. | |
| 6,662,280 B1 | 12/2003 | Hughes | |
| 6,718,839 B2 | 4/2004 | Chaudhry et al. | |
| 6,804,744 B1 | 10/2004 | Abbas | |
| 6,915,412 B2 | 7/2005 | Nguyen et al. | |
| 6,934,829 B2 | 8/2005 | Nguyen et al. | |
| 6,959,375 B2 | 10/2005 | Nguyen et al. | |
| 6,986,024 B2 | 1/2006 | Nguyen et al. | |
| 7,447,844 B2 * | 11/2008 | Clark | G06F 12/0817 711/118 |
| 7,447,845 B2 * | 11/2008 | Clark | G06F 12/0817 711/118 |
| 7,454,580 B2 | 11/2008 | Arimilli et al. | |
| 7,519,771 B1 | 4/2009 | Faanes et al. | |
| 7,539,820 B2 | 5/2009 | Hiratsuka | |
| 7,610,458 B2 | 10/2009 | Arimilli et al. | |
| 8,176,261 B2 | 5/2012 | Sugizaki | |
| 8,417,890 B2 | 4/2013 | Jacobi et al. | |
| 8,468,325 B2 | 6/2013 | Alexander et al. | |
| 8,495,341 B2 | 7/2013 | Busaba et al. | |
| 8,521,992 B2 | 8/2013 | Alexander et al. | |
| 8,533,438 B2 | 9/2013 | Hooker et al. | |
| 8,627,047 B2 | 1/2014 | Tsai et al. | |
| 8,650,286 B1 | 2/2014 | Sajassi et al. | |
| 8,930,629 B2 | 1/2015 | Ghai et al. | |
| 9,135,005 B2 | 9/2015 | Alexander et al. | |
| 9,251,084 B2 | 2/2016 | Kiyota | |
| 9,270,542 B2 | 2/2016 | Gamage et al. | |
| 9,400,752 B1 | 7/2016 | Alexander et al. | |
| 9,471,504 B2 | 10/2016 | Alexander et al. | |
| 9,483,409 B2 | 11/2016 | Alexander et al. | |
| 2008/0229070 A1 | 9/2008 | Charra et al. | |
| 2009/0210679 A1 | 8/2009 | Tsai et al. | |
| 2012/0117323 A1 | 5/2012 | Cypher et al. | |
| 2012/0221796 A1 | 8/2012 | Tran | |
| 2013/0318330 A1 | 11/2013 | Alexander et al. | |
| 2014/0013055 A1 | 1/2014 | Frey et al. | |
| 2014/0013060 A1 | 1/2014 | Frey et al. | |
| 2014/0143492 A1 | 5/2014 | Eckert et al. | |
| 2014/0164711 A1 | 6/2014 | Loh et al. | |
| 2014/0181482 A1 | 6/2014 | Smaus et al. | |
| 2014/0317357 A1 | 10/2014 | Kaplan et al. | |
| 2015/0095615 A1 | 4/2015 | Abdallah et al. | |
| 2015/0242250 A1 | 8/2015 | Guthrie et al. | |
| 2015/0242251 A1 | 8/2015 | Guthrie et al. | |
| 2015/0278120 A1 | 10/2015 | Shum | |
| 2015/0278121 A1 | 10/2015 | Gschwind et al. | |

OTHER PUBLICATIONS

Alexander et al., "Store Forwarding Cache", U.S. Appl. No. 15/155,493, filed Aug. 19, 2016, IBM, 22 pages.

* cited by examiner

STORE FORWARDING CACHE

BACKGROUND OF THE INVENTION

The present invention relates generally to the field of microprocessors, and more particularly to store to load data forwarding from a large number of uncommitted store instructions.

In high performance and especially out-of-order processors, operand store compare hazards contribute significantly to delays in instruction processing and check pointing. In microprocessors that execute load and store instructions out-of-order, three operand store compare hazards (store-hit-load, non-forwardable load-hit store, and persistent non-forwardable load-hit store) can occur due to reordering between dependent loads and stores. One way to alleviate these delays is to speculatively forward data form uncommitted stores to subsequent dependent loads. This forwarding is generally accomplished by keeping uncommitted store data in a queue-like structure, against which subsequent loads compare, and delivering the matching data to the load out of the queue.

SUMMARY

Embodiments of the present invention include a method, computer program product and system for executing a load with store forwarding data. In one embodiment, a load request is received, wherein the load request is a request to retrieve a piece of data from a location in memory and wherein the load request follows one or more store requests in a set of instructions to store a piece of data in the location in memory. One or more possible locations in a cache for a piece of data corresponding to the location in memory is determined. Responsive to determining the one or more possible locations in the cache, each possible location of the one or more possible locations in the cache is determined. If at least one location of the one or more possible locations contains data to be stored in the location in memory is determined. Responsive to determining that the at least one location of the one or more possible locations contains data to be stored in the location in memory, data in one location of the at least one location is loaded, wherein the data in the one location is from a store request of the one or more store requests and wherein the store request is closest in the set of instructions to the load request.

DETAILED DESCRIPTION

Figure 1:
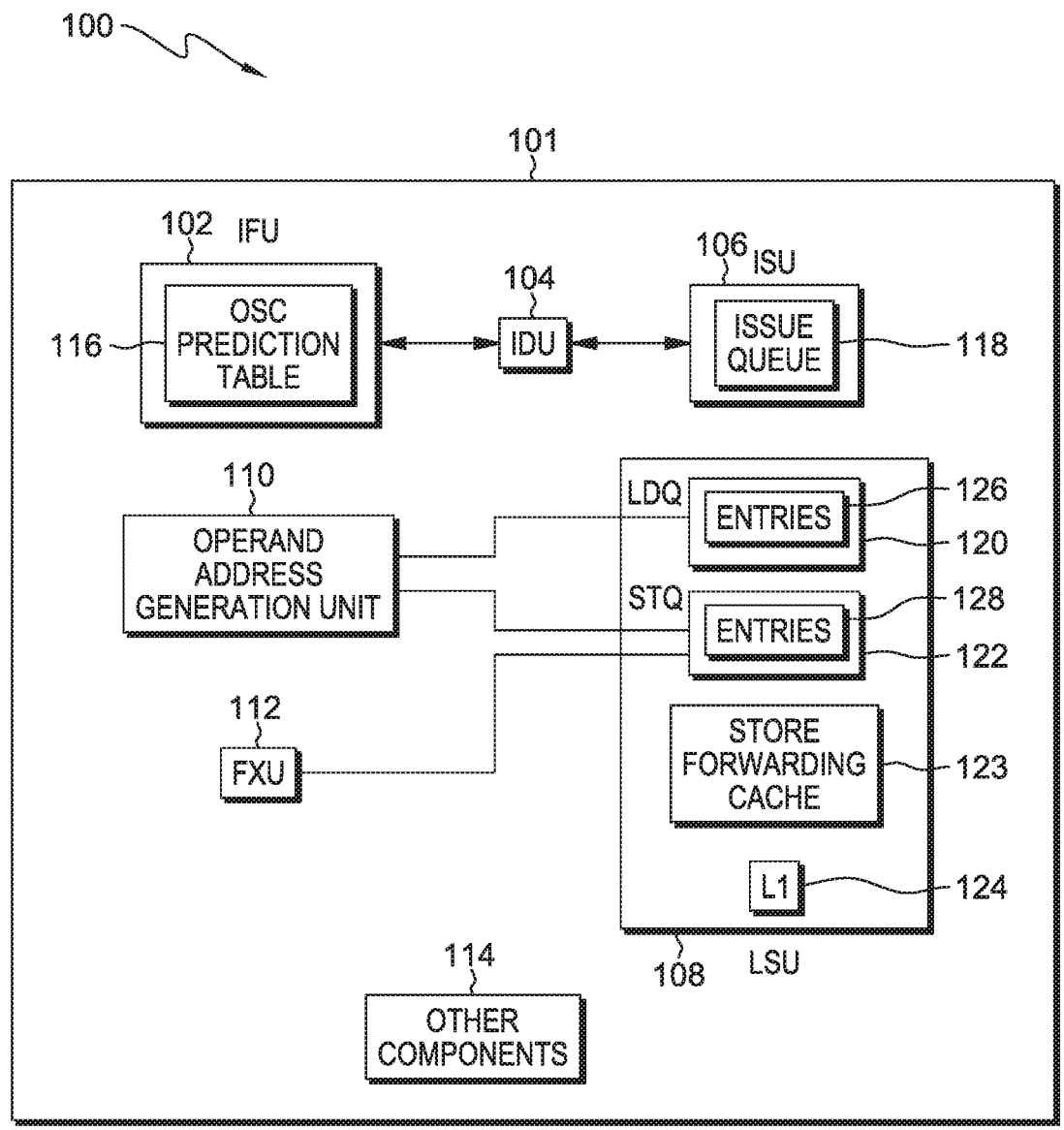
FIG. 1 is a functional block diagram of a computing system, in accordance with an embodiment of the present invention.

Embodiments of the present invention recognize that speculatively forwarding data from uncommitted stores to subsequent dependent loads has several limitations that make it unideal for use in a high performance, out-of-order processor. First, an out-of-order processor benefits from having a large number of queue entries to allow many store instructions in flight (completed instructions that are not yet retired) before check pointing and updating the local cache. However, the size of the queue is limited by the cycle time required to access all the entries for forwarding. Second, traditional store forwarding implementations must allocate space for store data on a per instruction basis. Since store instructions can have varying operand lengths (e.g., between 1 byte and 256 bytes), either some of the circuit area used to hold data to be forwarded per instruction is wasted or some of the data per instruction is not available for forwarding. A solution is required to solve both of the above referenced problems in a reasonable amount of circuit area.

Embodiments of the present invention provide for an associative cache that contains data from in-flight store instructions. Entries in the cache are populated by data from store instructions as those instructions execute. The entries are invalidated when the corresponding store instructions are flushed from the pipeline or checkpoint. Data from store instructions is forwarded to dependent loads from the cache instead of directly from a queue that tracks the store instructions, as known in the art. Data from the store instructions cache is also combined with data from the local cache to provide all bytes requested by a load. Finally, a load compares against a queue to validate the correctness of the data that was forwarded.

Embodiments of the present invention are superior to traditional queue-based forwarding techniques. First, the size of the queue that tracks in flight store instructions is decoupled from the size of the cache that forwards data to a given dependent load. This means that the queue can be larger, due to not having to store data to be forwarded, than a queue of an equivalent processor using traditional queue-based forwarding. The larger queue enables better performance with more in flight store instructions. Second, cache entries are dynamically allocated to stores in flight during execution time. This allows, for example with cache entries of 8 bytes, an in-flight store of 1 byte to use 1 cache entry and an in-flight store of 256 bytes to use 32 cache entries. This efficiently allocates circuit area per instruction and allows more stores in flight while neither being limited by the total store forwarding data structures available nor allowing less than the full operand length to be forwarded from every store. This benefit also applies in a multi-threaded processing core, where one thread may have more store instructions or store instructions with longer operands.

As used herein, the term "load" is used generally and makes reference to an instruction for loading data from memory. In some instances, the term "load" makes reference to data recently retrieved from memory. The term "store" is used generally and makes reference to an instruction for storing data into memory. In some instances, the term "store" makes reference to data recently written to memory. In an embodiment, memory can include any suitable volatile or non-volatile computer readable storage media. Memory may include random access memory (RAM), cache, optical and magnetic drives, thumb drives, and smart cards.

FIG. 1 is a block diagram illustrating one example of computing system 100 applicable to one or more processes, instructions, and data in accordance with one or more embodiments of the present invention. Computing system 100 comprises processor 101. The processor 101 comprises a single integrated circuit processor such as a superscale processor, which, includes various execution units, registers, buffers, memories, and other functional units that are formed by integrated circuitry. The processor 101, in one embodiment, is capable of issuing and executing instructions out-of-order. In an embodiment, processor 101 may be more than one processor.

The processor 101, in one embodiment, comprises an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, comprises an operand-store-compare (OSC) prediction table 116. The OSC prediction table 116 creates entries based on the instruction address of a load and remembers one or more flags for the load.

The ISU 106, in this embodiment, comprises an issue queue 118. The issue queue 118 holds decoded instructions that are dispatched and temporarily placed in the issue queue 118. The instruction are held in the issue queue 118 until all their required operands are available. From the issue queue 118, instructions can be issued opportunistically to execution units, e.g., LSU 108, FXU 112, etc., of the processor 101. In other words, the instructions can be issued out-of-order. The instructions, however, are maintained in the issue queue 118 until execution of the instructions is complete, and the result data, if any, are written back, in case any of the instructions need to be reissued.

The LSU 108, in this embodiment, comprises a load queue (LDQ) 120, a store queue (STQ) 122, a store forwarding cache 123, and an L1 cache 124. The LDQ 120 and the STQ 122 each comprise entries 126, 128, respectively, that track additional information associated with outstanding load and store instructions. The entries 126 in the LDQ 120 are the same as traditional entries in current out-of-order processors. The entries 128 in the STQ 122 are different than traditional entries in current out-of-order processors. The entries 128 tracks information associated with outstanding store instructions, however, the data of the outstanding store instructions is located in the store forwarding cache 123. It should be noted that various embodiments of the present invention are not limited to the configuration of the processor 101 as shown in FIG. 1. The embodiments of the present invention are applicable to a variety of architectures which can vary from the example shown in FIG. 1.

The store forwarding cache 123 is an n-way associative cache located in LSU 108 that contains data of outstanding store instructions (i.e., in flight store instructions). In other words, an n-way associative cache can have each entry in main memory go to any one of n number of ways or locations in the cache. In an alternative embodiment, the store forwarding cache 123 may be located in the L1 cache 124, may be located in the processor 101, or may be a part of other components 114 (a separate piece of memory). In yet another alternative embodiment, the store forwarding cache 123 may be located off of the processor 101. Entries in the store forwarding cache are populated by data from store instructions as those instructions execute. The entries are invalidated, or removed, when the corresponding store instructions are flushed from the pipeline or checkpoint. Data from store instructions is forwarded to dependent loads from the store forwarding cache 123 instead of directly from the entries 128 in the STQ 122, as done in traditional out-of-order processors. Data in the store forwarding cache 123 may also be combined with data from the local cache (e.g., I cache, L1 cache 124, etc.) when forwarded to the dependent loads.

The store forwarding cache 123 contains rows that are indexed using the instruction's logical address. Each row may contain multiple ways, and an entry occupies one of those ways. Each entry may consist of a logical address tag, a directory hit way tag, an instruction age/identifier tag, a byte validity indicator, and the store data. The directory hit way tag indicates which way in the local cache the entry (a line or block) is located. The logical address tag, in combination with the directory hit way tag, indicates the location of the entry in main memory. The instruction age/identifier tag indicates information that may be used to determine the age of the entry. The byte validity indicators indicate which bytes the entry is stored in. The store data is the data that is to be stored.

In an embodiment, a store may execute with enough bytes of result data that the instruction's operand address crosses an 8-byte boundary in the storage. Therefore, the store's data populates two separate cache entries in two adjacent indexes. The ways for each index are chosen independently. The high order portion of the store's logical address not used for indexing is added to each entry as the logical address tag. The store's directory hit way and instruction age tags are also added to each entry. The byte validity indicators are set according to which bytes in each entry are occupied by the store's data.

In general, the IFU 102 fetches instruction codes stored in an I-cache, which can be part of the L1 cache 124. These fetched instruction codes are decoded by the IDU 104 into instruction processing data. Once decoded, the instructions are dispatched and temporarily placed in an appropriate issue queue 118. The instructions are held in the issue queue 118 until all their required operands are available. From the issue queue(s) 118, instructions can be issued opportunistically to the execution units, e.g., LSU 108, FXU 112, etc., of the processor 101 for execution. In other words, the instructions can be issued out-of-order. The instructions, however, are maintained in the issue queue(s) 118 until execution of the instructions is complete, and the result data, if any, are written back, in case any of the instructions need to be reissued.

During execution within one of the execution units, e.g., LSU 108, FXU 112, an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

Figure 2:
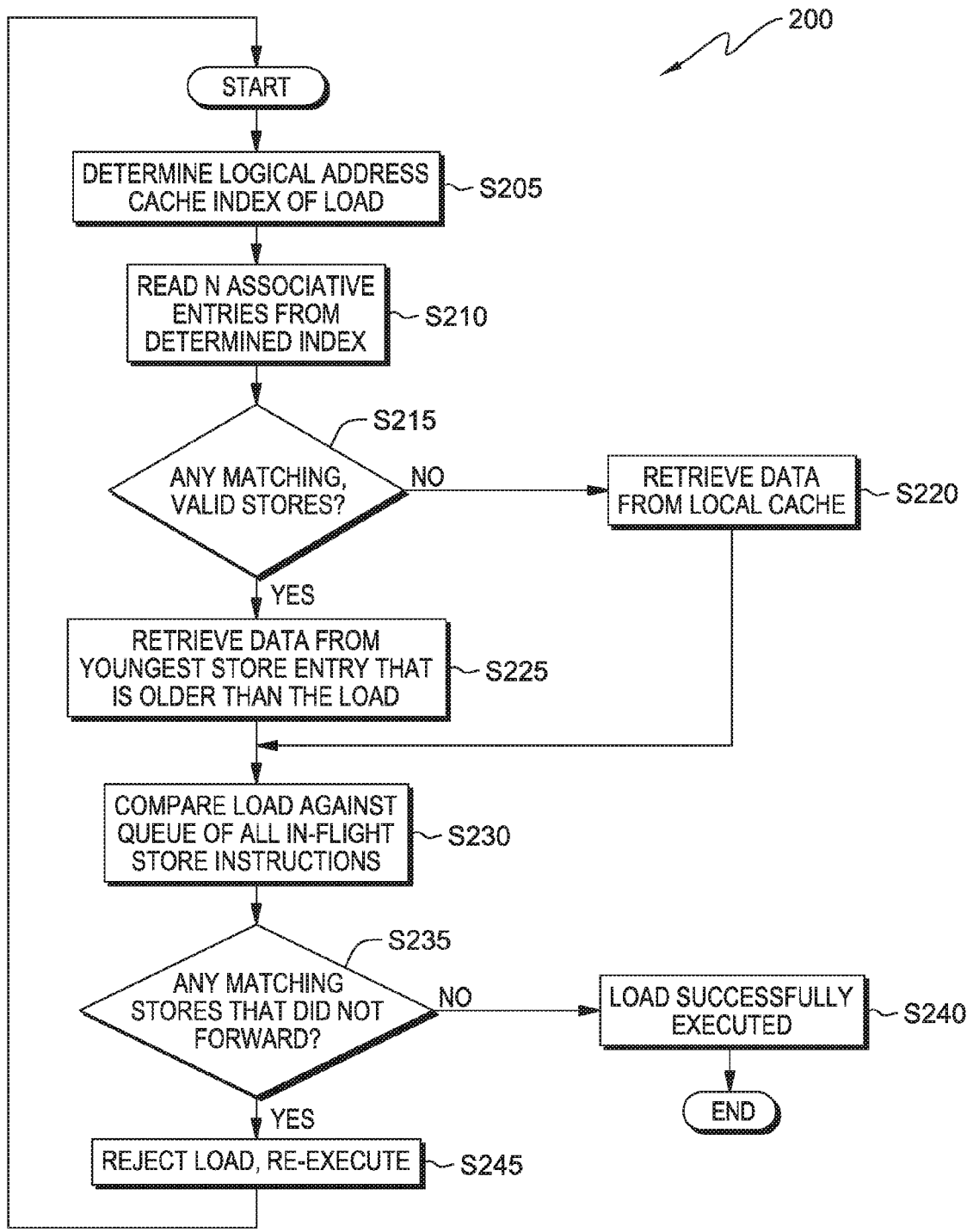
FIG. 2 is a flowchart depicting operational steps for executing a load with possible store forwarding data, in accordance with an embodiment of the present invention.

FIG. 2 is a flowchart of workflow 200 depicting operational steps for executing a load with possible store forwarding data, in accordance with an embodiment of the present invention. In one embodiment, the steps of the workflow are performed by LSU 108. Alternatively, steps of the workflow can be performed by any other program while working with LSU 108. In an embodiment, LSU 108 may invoke workflow 200 upon receiving a load request. In an alternative embodiment, LSU 108 may invoke workflow 200 upon performing out-of-order processing.

LSU 108 determines the logical address cache index of the load (step S205). The LSU 108 receives a load request for a piece of data that is located in main memory. Based on the location of the data in main memory, the LSU 108 determines the appropriate index(es) of the store forwarding cache 123 that the piece of data could be located. For each individual byte of the piece of data in the load request, the LSU 108 determines the appropriate index(s) of the store forwarding cache. In other words, each byte of the piece of data of the load request may have multiple index(s).

LSU 108 reads n-associative entry locations from the determined index (step S210). As discussed in the previous step, LSU 108 determines the appropriate index(es) of the store forwarding cache 123 that the piece of data could be located. LSU 108 reads each way of the store forwarding cache 123 based on the determined index(s). In other words LSU 108 reads each possible location on the store forwarding cache 123 the piece of data may be stored if the store forwarding cache 123 has the data.

LSU 108 determines if there are any matching and valid stores (step S215). LSU 108 determines if the read locations from the previous step contain the piece of data that is required for the load. LSU 108 compares the logical address tag, directory hit way tag, and byte validity indicators of each read location to information about the requested load to make the determination.

If there are not any matching, valid stores (decision block 5215, no branch), LSU 108 retrieves the load data from the local cache (step S220). LSU 108 performs retrieval of the load data in traditional manners known in the art. LSU 108 may retrieve the load data from any number of caches (not shown) or main memory.

If there are any matching, valid stores (decision block S215, yes branch), LSU 108 retrieves the data from the youngest store entry that is older than the load (step S225). A matching and valid store has a logical address tag that is equal to the corresponding portion of the load's logical address, a directory hit way tag equal to the directory hit way of the load, and a byte validity indicator(s) active for byte(s) requested by the load. In an embodiment, if only one store entry is found in the store forwarding cache 123 for a piece of data, then LSU 108 retrieves the data from that entry. In an alternative embodiment, if there are more than one store entry found in the store forwarding cache 123 for a piece of data, then LSU 108 retrieves the youngest (i.e., the closest to age of the load), that is older than the load (i.e., occurred before the load). To do this, the load's instruction age is compared to the instruction age tags of the determined matching, valid stores. In yet another alternative embodiment, if there are multiple store entries found in the store forwarding cache 123 for multiple pieces of data of a load request, then LSU 108 retrieves the youngest store entry for each piece of data that is older than the load.

LSU 108 compares the load against a queue of all in-flight store instructions (step S230). In-flight store instructions are entries 128 found in STQ 122 and are instructions that have been completed, or processed, but have not yet been retired. LSU 108 compares the load received in steps S205 to the entries 128 found in STQ 122. STQ 122 does not contain the store forwarding data. The store forwarding data is found in the store forwarding cache 123, discussed previously.

LSU 108 determines if there are any matching stores that did not forward (decision block S235). In other words, LSU 108 determines if there are any stores in the STQ 122 that did not have their store data from the store forwarding cache 123 forwarded. This may occur in an instance where the store data is not yet available in the store forwarding cache 123. If there are not any matching stores that did not forward (decision block S235, no branch), the load successfully executed (step S240) and processor 101 continues to process load/store requests in a traditional manner. If there are matching stores that did not forward (decision block S235, yes branch), the load is rejected (step S245), or does not occur, and the load is re-executed and processing begins at step S205.

Figure 3:
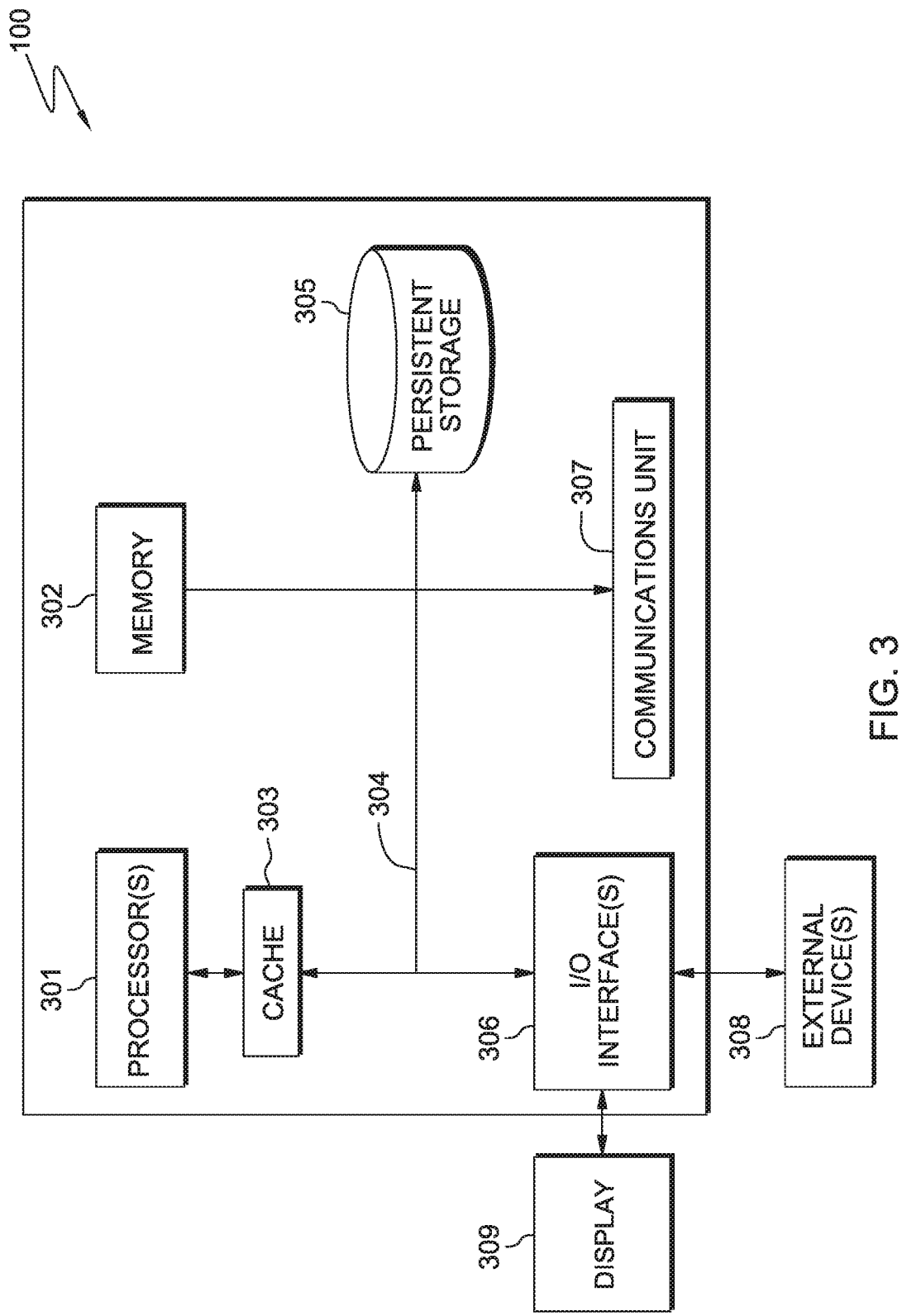
FIG. 3 depicts a block diagram of components of the computing system of FIG. 1, in accordance with an embodiment of the present invention.

FIG. 3 depicts computing system 100 that is an example of a system that includes store forwarding cache 123. Processors 301 and cache 303 are substantially equivalent to processor 101, store forwarding cache 123, and L1 cache 124, discussed previously. Computer system 300 includes processors 301, cache 303, memory 302, persistent storage 305, communications unit 307, input/output (I/O) interface (s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for executing a load with store forwarding data, the computer system comprising:
   one or more computer processors;
   one or more computer readable non-transitory storage media; and
   program instructions stored on the one or more computer readable non-transitory storage media for execution by at least one of the one or more processors, the program instructions comprising:
      program instructions to receive a load request, wherein the load request is a request to retrieve a piece of data from a location in memory, and wherein the load request follows one or more store requests in a set of instructions to store a piece of data in the location in memory, and wherein memory is one or more of the following: volatile computer readable storage media, non-volatile computer readable storage media, random access memory (RAM), cache, optical and magnetic drives, thumb drives, or smart cards;
      program instructions to determine one or more possible locations in a cache for a piece of data corresponding to the location in memory, wherein the cache is an n-way associative cache, and wherein the cache contains a plurality of entries and wherein each entry includes the following: a logical address tag, a directory hit way tag, an instruction age/identifier tag, a byte validity indicator, and store data;
      program instructions to utilize a table, wherein the table includes a list of all store requests, processed but not retired, in the set of store instructions to store a piece of data in the location in memory;
      program instructions to determine whether the one or more possible locations contain data corresponding to each store request of the store requests in the table;
      responsive to determining the one or more possible locations does not contain data corresponding to each store request of the store requests in the table, program instructions to reject the loaded data;
      responsive to determining the one or more possible locations in the cache, program instructions to read each possible location of the one or more possible locations in the cache;
      program instructions to determine if at least one location of the one or more possible locations contains data to be stored in the location in memory;
      responsive to determining that the at least one location of the one or more possible locations contains data to be stored in the location in memory, program instructions to load data in one location of the at least one location, wherein the data in the one location is from a store request of the one or more store requests, and wherein the store request is closest in the set of instructions to the load request;
      program instructions to determine that the loaded data contained a portion of total data requested by the load request; and
      responsive to determining the loaded data contained a portion of total data requested by the load request, program instructions to load, from memory, a remaining portion of the total data requested by the load request.

* * * * *